(12) United States Patent
Takahashi

(10) Patent No.: US 9,827,874 B2
(45) Date of Patent: Nov. 28, 2017

(54) VEHICLE

(71) Applicant: TOYOTA JIDOSHA KABUSHIKI KAISHA, Toyota-shi, Aichi-ken (JP)

(72) Inventor: Yoshimitsu Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 14/929,865

(22) Filed: Nov. 2, 2015

(65) Prior Publication Data

US 2016/0129810 A1 May 12, 2016

(30) Foreign Application Priority Data

Nov. 7, 2014 (JP) ................................. 2014-227130

(51) Int. Cl.
*B60W 20/00* (2016.01)
*B60L 15/20* (2006.01)
(Continued)

(52) U.S. Cl.
CPC .......... *B60L 15/2036* (2013.01); *B60K 6/445* (2013.01); *B60K 6/52* (2013.01); *B60W 20/14* (2016.01); *B60W 20/17* (2016.01); *B60W 30/18109* (2013.01); *B60W 30/18127* (2013.01); *B60W 30/20* (2013.01); *B60W 2540/10* (2013.01); *B60W 2540/12* (2013.01); *B60W 2710/083* (2013.01); *B60W 2720/403* (2013.01); *Y02T 10/6239* (2013.01);
(Continued)

(58) Field of Classification Search
None
See application file for complete search history.

(56) References Cited

U.S. PATENT DOCUMENTS 5,967,621 A * 10/1999 Ito ............................. B60T 8/00
303/15
6,886,648 B1 * 5/2005 Hata ....................... B60K 6/387
180/65.235
(Continued)

FOREIGN PATENT DOCUMENTS

JP H07-163008 A 6/1995
JP 099099820 * 4/1997
(Continued)

*Primary Examiner* — Ryan Rink
(74) *Attorney, Agent, or Firm* — Oliff PLC

(57) ABSTRACT

A vehicle includes a front-wheel/rear-wheel motor, a battery and an ECU. The ECU is configured to (i) control the front-wheel/rear-wheel motors, and (ii) control the front-wheel/rear-wheel motors such that a braking torque of a resonance-side motor, when at least one of the rotation speed of the front-wheel/rear-wheel motors is within a resonance range, is smaller than the braking torque of the resonance-side motor, when the rotation speed of the front-wheel/rear-wheel motors are outside the resonance range, and such that the braking torque of a non-resonance-side motor, when at least one of the rotation speed of the front-wheel/rear-wheel motors is within a resonance range, is larger than the braking torque of the non-resonance-side motor, when the rotation speed of the front-wheel/rear-wheel motors are outside the resonance range, during deceleration caused by a braking torque from the front-wheel/rear-wheel motors.

4 Claims, 7 Drawing Sheets

(51) Int. Cl.
  *B60K 6/445* (2007.10)
  *B60K 6/52* (2007.10)
  *B60W 30/18* (2012.01)
  *B60W 30/20* (2006.01)
  *B60W 20/14* (2016.01)
  *B60W 20/17* (2016.01)

(52) U.S. Cl.
  CPC ........ *Y02T 10/6265* (2013.01); *Y02T 10/7258* (2013.01); *Y10S 903/903* (2013.01)

(56) References Cited

U.S. PATENT DOCUMENTS

| | | | | |
|---|---|---|---|---|
| 2005/0099146 A1* | 5/2005 | Nishikawa | ............. | B60W 20/11 318/63 |
| 2014/0175927 A1* | 6/2014 | Hattori | .................... | H02K 5/24 310/112 |
| 2016/0167527 A1* | 6/2016 | Jeon | ......................... | B60L 7/26 701/70 |

FOREIGN PATENT DOCUMENTS

| | | |
|---|---|---|
| JP | 2002-078110 A | 3/2002 |
| JP | 2005151633 A | 6/2005 |
| JP | 2009-247040 A | 10/2009 |
| JP | 2009-248913 A | 10/2009 |
| JP | 2010-114978 A | 5/2010 |

* cited by examiner

VEHICLE

INCORPORATION BY REFERENCE

The disclosure of Japanese Patent Application No. 2014-227130 filed on Nov. 7, 2014 including the specification, drawings and abstract is incorporated herein by reference in its entirety.

BACKGROUND OF THE INVENTION

1. Field of the Invention

The invention relates to a vehicle that is equipped with a first-wheel motor that can receive/output motive power to/from front wheels, a rear-wheel motor that can receive/output motive power to/from rear wheels, and a battery that can exchange electric power with the front-wheel motor and the rear-wheel motor.

2. Description of Related Art

In Japanese Patent Application Publication No. 2005-151633 (JP 2005-151633 A), there is disclosed a vehicle that is equipped with an engine, a first generator-motor, a second generator-motor and a brake mechanism. The first generator-motor is connected to the engine and is connected to front wheels via a transmission. The second generator-motor is connected to rear wheels via rotation transmission means having higher transmission efficiency than the transmission. The brake mechanism applies a braking force to the front wheels and the rear wheels. With this vehicle, a target deceleration torque of the vehicle is set at the time of deceleration of the vehicle. The target deceleration torque is guarded by a maximum permissible value of the second generator-motor, and a target braking torque of the second generator-motor is set. A difference between the target deceleration torque and the target braking torque of the second generator-motor is guarded by a maximum permissible value of the first generator-motor, and a target braking torque of the first generator-motor is set. A target braking torque of the brake mechanism is set to a deficiency in the sum of the target braking torques of the first generator-motor and the second generator-motor with respect to the target deceleration torque. Then, the first generator-motor, the second generator-motor, and the brake mechanism are controlled based on the respective target braking torques. Owing to this control, the utilization efficiency of energy at the time of deceleration of the vehicle can be enhanced.

SUMMARY OF THE INVENTION

With above-mentioned vehicle, when the rotational speed of the first generator-motor or the rotational speed of the second generator-motor is within a resonance range causing resonance with a regeneration-originated noise, which is a noise resulting from regenerative driving of the first generator-motor or the second generator-motor, at the time of deceleration of the vehicle, the regeneration-originated noise is amplified. This regeneration-originated noise increases as the absolute value of the torque of the first generator-motor or the second generator-motor increases. With the aforementioned vehicle, a large braking torque (a large regenerative torque) is output from the second generator-motor at the time of deceleration of the vehicle. Therefore, when the rotational speed of the second generator-motor is within the resonance range, the regeneration-originated noise may become relatively large and perceptible to a driver. Thus, the riding comfort of the driver may be deteriorated.

The invention provides a vehicle that restrains the riding comfort of a driver from deteriorating during deceleration.

A first aspect of the invention provides a vehicle includes an accelerator pedal, a brake pedal, a front wheel, a rear wheel, a front-wheel motor, a rear-wheel motor, a battery and an electronic control unit. The front-wheel motor is configured to receive and output motive power to and from the front wheel. The rear-wheel motor is configured to receive and output motive power to and from the rear wheel. The battery is configured to exchange electric power with the front-wheel motor and the rear-wheel motor. The electronic control unit is configured to: (i) control the front-wheel motor and the rear-wheel motor such that the vehicle runs with a required torque based on accelerator operation and brake operation, and (ii) control the front-wheel motor and the rear-wheel motor such that a braking torque of a resonance-side motor, when at least one of the rotation speed of the front-wheel motor and the rotation speed of the rear-wheel motor is within a resonance range at which at least one of the front-wheel motor and the rear-wheel motor resonates, being smaller than the braking torque of the resonance-side motor, when the rotation speed of the front-wheel motor and the rotation speed of the rear-wheel motor are outside the resonance range at which the front-wheel motor and the rear-wheel motor does not resonates, and such that the braking torque of a non-resonance-side motor, when at least one of the rotation speed of the front-wheel motor and the rotation speed of the rear-wheel motor is within a resonance range at which at least one of the front-wheel motor and the rear-wheel motor resonates, being larger than the braking torque of the non-resonance-side motor, when the rotation speed of the front-wheel motor and the rotation speed of the rear-wheel motor are outside the resonance range at which the front-wheel motor and the rear-wheel motor does not resonates, during deceleration caused by a braking torque from the front-wheel motor and a braking torque from the rear-wheel motor, the resonance-side motor being one of the front-wheel motor and the rear-wheel motor whose rotational speed is within the resonance range, and the non-resonance-side motor being one of the front-wheel motor and the rear-wheel motor whose rotational speed is outside the resonance range.

According to the aforementioned configuration, the front-wheel motor and the rear-wheel motor are controlled such that the vehicle runs with the required torque corresponding to accelerator operation and brake operation. Then, the front-wheel motor and the rear-wheel motor are controlled during deceleration caused by the braking torque (a regenerative torque) from the front-wheel motor and the braking torque (a regenerative torque) from the rear-wheel motor, in such a manner as to make the braking torque of the resonance-side motor, namely, that one of the front-wheel motor and the rear-wheel motor whose rotational speed is within the resonance range smaller at the time of predetermined resonance than at the time of predetermined non-resonance, and to make the braking torque of the non-resonance-side motor, namely, that one of the front-wheel motor and the rear-wheel motor whose rotational speed is outside the resonance range larger at the time of predetermined resonance than at the time of predetermined non-resonance. The rotational speed of the front-wheel motor or the rear-wheel motor is within the resonance range at the time of predetermined resonance, and the rotational speeds of the front-wheel motor and the rear-wheel motor are outside the resonance range at the time of predetermined non-resonance. Accordingly, the braking torque of the resonance-side motor is made smaller, so a noise resulting from regenerative driving of the front-wheel motor or the rear-wheel motor can be restrained from being perceived by the driver. As a result, the riding comfort of the driver can be restrained from deteriorating.

In the vehicle, the electronic control unit may be configured to control the front-wheel motor and the rear-wheel motor during the deceleration, such that an amount of reduction in the braking torque of the resonance-side motor and an amount of increase in the braking torque of the non-resonance-side motor, when at least one of the rotation speed of the front-wheel motor and the rotation speed of the rear-wheel motor is within a resonance range at which at least one of the front-wheel motor and the rear-wheel motor resonates, increase more as a vehicle speed decreases, than the amount of reduction in the braking torque of the resonance-side motor and the amount of increase in the braking torque of the non-resonance-side motor when the rotation speed of the front-wheel motor and the rotation speed of the rear-wheel motor are outside the resonance range at which the front-wheel motor and the rear-wheel motor does not resonates. According to the aforementioned configuration, a noise resulting from regenerative driving of the front-wheel motor or the rear-wheel motor can be more reliably restrained from being perceived by the driver.

In the vehicle, the electronic control unit may be configured to set a first basic torque of the front-wheel motor and to set a second basic torque of the rear-wheel motor based on the required torque, during the deceleration. The electronic control unit may be configured to drive the front-wheel motor with the first basic torque and to drive the rear-wheel motor with the second basic torque, when the rotation speed of the front-wheel motor and the rotation speed of the rear-wheel motor are outside the resonance range at which the front-wheel motor and the rear-wheel motor does not resonates. The electronic control unit may be configured to drive the front-wheel motor with a torque whose absolute value is smaller than the first basic torque, and to drive the rear-wheel motor with a torque whose absolute value is larger than the second basic torque, when the rotational speed of the front-wheel motor is within the resonance range at which the front-wheel motor resonates. The electronic control unit may be configured to drive the rear-wheel motor with a torque whose absolute value is smaller than the second basic torque, and to drive the front-wheel motor with a torque whose absolute value is larger than the first basic torque, when the rotational speed of the rear-wheel motor is within the resonance range at which the rear-wheel motor does not resonates.

In the vehicle, the electronic control unit may be configured to drive the front-wheel motor with the first basic torque and drive the rear-wheel motor with the second basic torque when the rotational speed of the front-wheel motor is within the resonance range and the absolute value of the first basic torque is equal to or smaller than a first threshold, during the deceleration. In the vehicle, the electronic control unit may be configured to drive the front-wheel motor with the first basic torque and drive the rear-wheel motor with the second basic torque when the rotational speed of the rear-wheel motor is within the resonance range and the absolute value of the second basic torque is equal to or smaller than a second threshold, during the deceleration.

In the vehicle, the electronic control unit may be configured to increase a ratio of a torque of the rear wheel to a sum of a torque of the front wheel and the torque of the rear wheel as a brake operation amount increases, during the deceleration. As the brake operation amount increases, the deceleration increases, and the likelihood of the vehicle assuming a forward-bent posture increases. According to the aforementioned configuration, the vehicle can be restrained from assuming a forward-bent posture. As a result, the stability of the running posture of the vehicle can be restrained from decreasing.

In the vehicle may further include an engine, a generator and a planetary gear. The planetary gear may include three rotary elements. The three rotary elements may be connected to a front-wheel drive shaft that is coupled to the front wheel, an output shaft of the engine, and a rotary shaft of the generator respectively.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Next, the embodiment of the invention will be described using the drawings.

Figure 1:
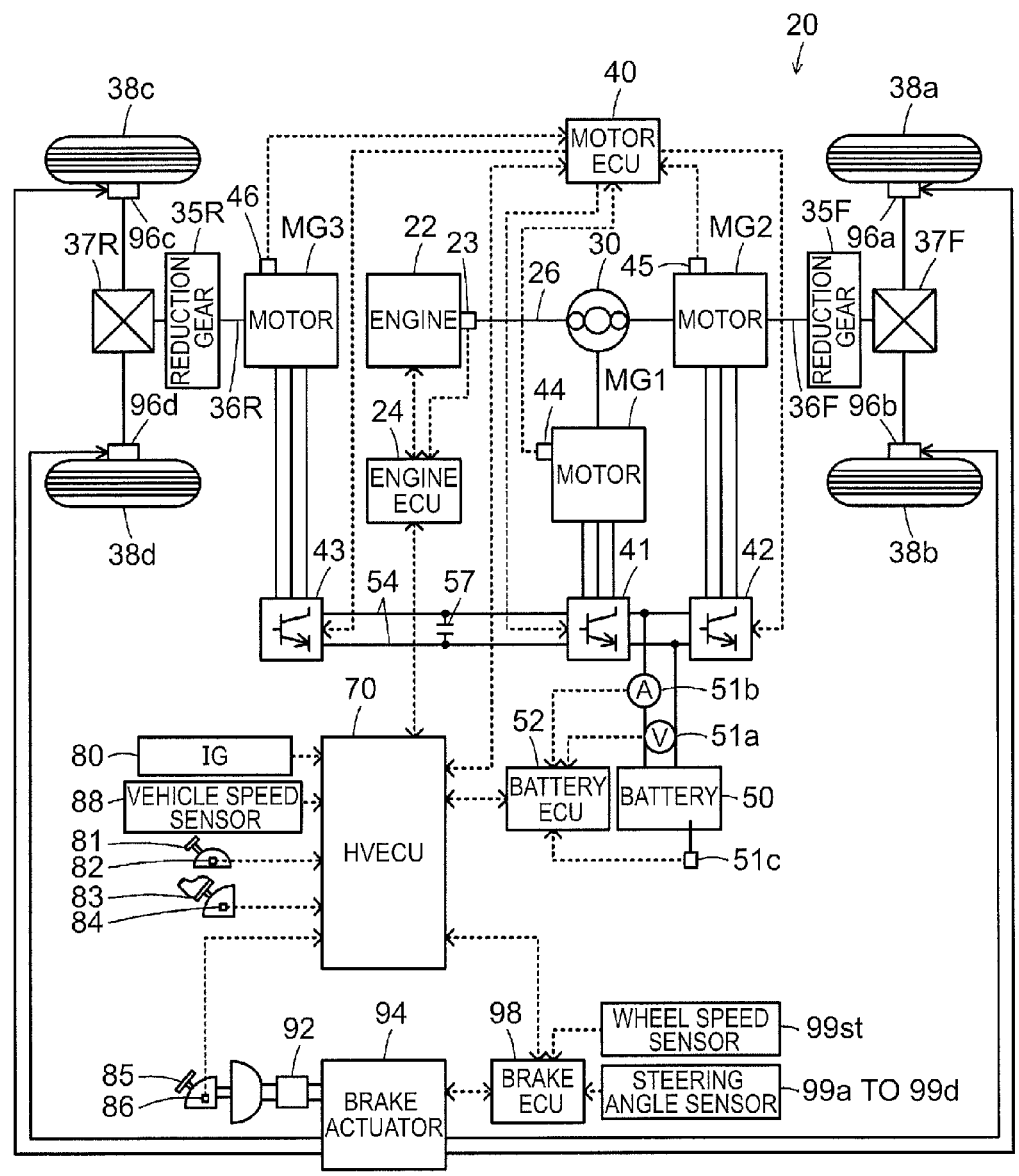
FIG. 1 is a block diagram showing the schematic configuration of a hybrid vehicle 20 as the embodiment of the invention.

FIG. 1 is a block diagram showing the schematic configuration of a hybrid vehicle 20 in the embodiment of the invention. As shown in the drawing, the hybrid vehicle 20 is equipped with an engine 22, a planetary gear 30, motors MG1, MG2, MG3, inverters 41, 42, 43, a battery 50, a brake actuator 94, and a hybrid electronic control unit (hereinafter referred to as an HVECU) 70.

The engine 22 is an internal combustion engine that outputs motive power using gasoline, light oil or the like as fuel. The operation of this engine 22 is controlled by an engine electronic control unit (hereinafter referred to as an engine ECU) 24.

Although not shown in the drawing, the engine ECU 24 is configured as a microprocessor that is mainly constituted of a CPU. In addition to the CPU, the engine ECU 24 is equipped with a ROM that stores processing programs, a RAM that temporarily stores data, receive/output ports, and a communication port. Signals from various sensors that are needed to control the operation of the engine 22, for example, a crank angle θcr from a crank position sensor 23 that detects a rotational position of a crankshaft 26, and the like are received to the engine ECU 24 via the receive ports. Besides, various control signals for controlling the operation of the engine 22, for example, drive signals to fuel injection valves, a drive signal to a throttle motor that adjusts the position of a throttle valve, a control signal to an ignition coil that is integrated with an igniter, and the like are output from the engine ECU 24 via the output ports. The engine ECU 24 calculates a rotational speed of the crankshaft 26, namely, a rotational speed Ne of the engine 22 based on the crank angle θcr detected by the crank position sensor 23. The engine ECU 24 is connected to the HVECU 70 via the communication port. The engine ECU 24 controls the operation of the engine 22 through a control signal from the HVECU 70, and outputs data on the operation state of the engine 22 to the HVECU 70 according to need.

The planetary gear 30 is configured as a single pinion-type planetary gear mechanism. A rotor of a motor MG1 is connected to a sun gear of the planetary gear 30. A drive shaft 36F, which is coupled to front wheels 38a, 38b via a differential gear 37F and a reduction gear 35F, is connected to a ring gear of the planetary gear 30. The crankshaft 26 of the engine 22 is connected to a carrier of the planetary gear 30.

The motor MG1 is configured as, for example, a synchronous generator-motor, and the rotor of the motor MG1 is connected to the sun gear of the planetary gear 30 as described above. A motor MG2 is configured as, for example, a synchronous generator-motor, and a rotor of the motor MG2 is connected to the drive shaft 36F. A motor MG3 is configured as, for example, a synchronous generator-motor. A drive shaft 36R, which is coupled to rear wheels 38c, 38d via a differential gear 37R and a reduction gear 35R, is connected to the motor MG3. The motors MG1, MG2, MG3 are rotationally driven through switching control of switching elements (not shown) of inverters 41, 42, 43 by a motor electronic control unit (hereinafter referred to as a motor ECU) 40, respectively. A smoothing capacitor 57 is connected to an electric power line 54 to which the inverters 41, 42, 43 and the battery 50 are connected.

Although not shown in the drawing, the motor ECU 40 is configured as a microprocessor that is mainly constituted of a CPU. In addition to the CPU, the motor ECU 40 is equipped with a ROM that stores processing programs, a RAM that temporarily stores data, receive/output ports, and a communication port. Signals from various sensors that are needed to control the driving of the motors MG1, MG2, MG3, for example, rotational positions θm1, θm2, θm3 from rotational position detecting sensors 44, 45, 46 that detect rotational positions of the rotors of the motors MG1, MG2, MG3 respectively, phase currents from current sensors that detect currents flowing through respective phases of the motors MG1, MG2, MG3, and the like are received to the motor ECU 40 via the receive ports. Switching control signals to the switching elements (not shown) of the inverters 41, 42, 43 and the like are output from the motor ECU 40 via the output ports. The motor ECU 40 calculates rotational speeds Nm1, Nm2, Nm3 of the motors MG1, MG2, MG3 based on the rotational positions θm1, θm2, θm3 of the rotors of the motors MG1, MG2, MG3 detected by the rotational position detecting sensors 44, 45, 46, respectively. The motor ECU 40 is connected to the HVECU 70 via the communication port. The motor ECU 40 controls the driving of the motors MG1, MG2, MG3 through a control signal from the HVECU 70, and outputs data on driving states of the motors MG1, MG2, MG3 to the HVECU 70 according to need.

The battery 50 is configured as, for example, a lithium-ion secondary battery or a nickel-metal hydride secondary battery, and exchanges electric power with the motors MG1, MG2, MG3 via the inverters 41, 42, 43 respectively. This battery 50 is managed by a battery electronic control unit (hereinafter referred to as a battery ECU) 52.

Although not shown in the drawing, the battery ECU 52 is configured as a microprocessor that is mainly constituted of a CPU. In addition to the CPU, the battery ECU 52 is equipped with a ROM that stores processing programs, a RAM that temporarily stores data, receive/output ports, and a communication port. Signals that are needed to manage the battery 50, for example, a battery voltage VB from a voltage sensor 51a that is installed between terminals of the battery 50, a battery current IB from a current sensor 51b that is attached to the output terminal of the battery 50, a battery temperature TB from a temperature sensor 51c that is attached to the battery 50, and the like are received to the battery ECU 52 via the receive ports. In order to manage the battery 50, the battery ECU 52 calculates a storage ratio SOC, which is a ratio of a capacity of an electric power that can be discharged from the battery 50 at that moment to an entire capacity, based on an integrated value of the battery current IB detected by the current sensor 51b. The battery ECU 52 is connected to the HVECU 70 via the communication port, and outputs data on the state of the battery 50 to the HVECU 70.

The brake actuator 94 is configured as an actuator for applying a braking force to the front wheels 38a, 38b and the rear wheels 38c, 38d. Concretely, the brake actuator 94 sets a braking force applied to the vehicle, in accordance with a vehicle speed V and a pressure of a master cylinder 92 (a braking pressure) that is generated in response to depression of a brake pedal 85. The brake actuator 94 is configured to be able to adjust oil pressures in brake wheel cylinders 96a, 96b, 96c, 96d such that braking forces corresponding to distributed components of the braking force are applied to the front wheels 38a and 38b and the rear wheels 38c, 38d respectively, and to adjust oil pressures applied to the brake wheel cylinders 96a, 96b, 96c, 96d such that braking forces are applied to the front wheels 38a, 38b and the rear wheels 38c, 38d respectively independently of depression of the brake pedal 85. The driving of this brake actuator 94 is controlled by a brake electronic control unit (hereinafter referred to as a brake ECU) 98.

Although not shown in the drawing, the brake ECU 98 is configured as a microprocessor that is mainly constituted of a CPU. In addition to the CPU, the brake ECU 98 is equipped with a ROM that stores processing programs, a RAM that temporarily stores data, receive/output ports, and a communication port. Signals from various sensors that are needed to control the driving of the brake actuator 94, for example, a master cylinder pressure (a brake depression force Fb) that is detected by a pressure sensor (not shown) that is attached to the master cylinder 92, wheel speeds Vwa to Vwd from wheel speed sensors 99a to 99d that are attached to the front wheels 38a, 38b and the rear wheels 38c, 38d respectively, a steering angle θst from a steering angle sensor 99st, and the like are received to the brake ECU 98 via the receive ports. A drive control signal to the brake actuator 94 and the like are output from the brake ECU 98 via the output ports. The brake ECU 98 is connected to the HVECU 70 via the communication port. The brake ECU 98 controls the driving of the brake actuator 94 through a control signal from the HVECU 70, and outputs data on the state of the brake actuator 94 to the HVECU 70 according to need. The brake ECU 98 causes signals such as the wheel speeds Vwa to Vwd of the front wheels 38a, 38b and the rear wheels 38c, 38d from the wheel speed sensors 99a to 99d, the steering angle θst from the steering angle sensor 99st, and the like to be received thereto. The brake ECU 98 performs vehicle behavior stabilizing control such as an antilock brake device function (ABS) for preventing any one of the front wheels 38a, 38b and the rear wheels 38c, 38d from being locked to slip when the driver depresses the brake pedal 85, traction control (TRC) for preventing any one of the front wheels 38a, 38b from slipping due to idle running when the driver depresses an accelerator pedal 83, posture maintaining control (VSC) for maintaining the posture of the vehicle when the vehicle runs while making a turn, and the like.

Although not shown in the drawing, the HVECU 70 is configured as a microprocessor that is mainly constituted of a CPU. In addition to the CPU, the HVECU 70 is equipped with a ROM that stores processing programs, a RAM that temporarily stores data, receive/output ports, and communication ports. An ignition signal from an ignition switch 80, a shift position SP from a shift position sensor 82 that detects an operation position of a shift lever 81, an accelerator opening degree Acc from an accelerator pedal position sensor 84 that detects a depression amount of the accelerator pedal 83, a brake pedal position BP from a brake pedal position sensor 86 that detects a depression amount of the brake pedal 85, the vehicle speed V from a vehicle speed sensor 88, and the like are received to the HVECU 70 via the receive ports. The HVECU 70 is connected to the engine ECU 24, the motor ECU 40, and the battery ECU 52 via the communication ports as described above, and exchanges various control signals and data with the engine ECU 24, the motor ECU 40, and the battery ECU 52.

The hybrid vehicle 20 of the embodiment of the invention thus configured runs in a hybrid running mode (an HV running mode) in which the vehicle runs with the engine 22 in operation, or in an electric running mode (an EV running mode) in which the vehicle runs with the engine 22 out of operation.

Figure 2:
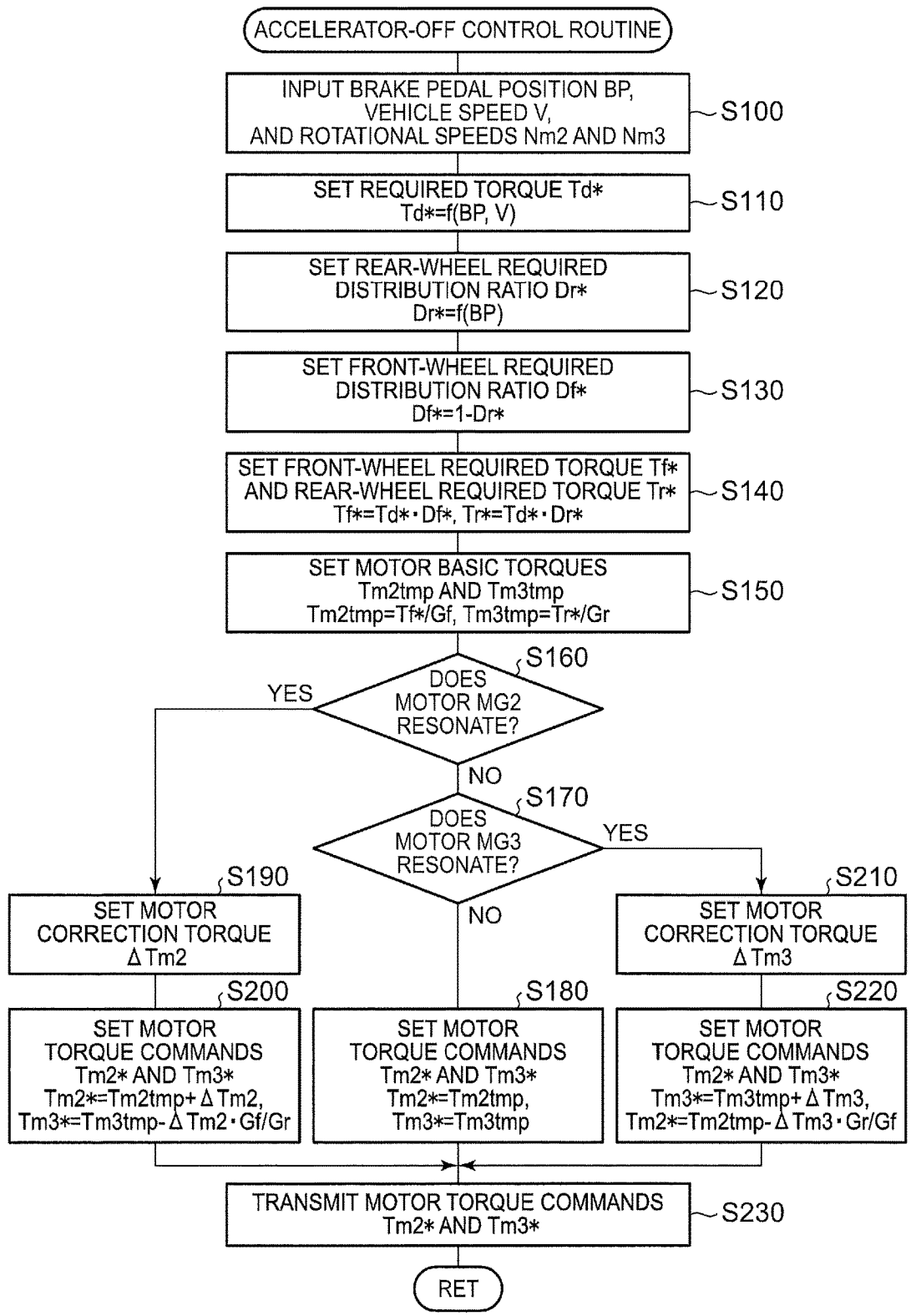
FIG. 2 is a flowchart showing an exemplary accelerator-off control routine that is executed by an HVECU 70 of the present embodiment of the invention.

Next, the operation of the hybrid vehicle 20 of the embodiment of the invention thus configured, especially the operation thereof at the time when the accelerator is off will be described. FIG. 2 is a flowchart showing an exemplary accelerator-off control routine that is executed by the HVECU 70 of the embodiment of the invention. This routine is repeatedly executed at intervals of a predetermined time (e.g., at intervals of several milliseconds) when the accelerator is off. Incidentally, when the accelerator is off, the HVECU 70 transmits a self-sustained operation command to the engine ECU 24 such that the engine 22 is operated in a self-sustained manner, sets a torque command $Tm1^*$ of the motor MG1 to a value of 0, and transmits this torque command $Tm1^*$ to the motor ECU 40, in parallel with this routine. Then, the engine ECU 24 that has received the self-sustained operation command performs intake air amount control, fuel injection control, ignition control and the like such that the engine 22 is operated in a self-sustained manner at a predetermined rotational speed (e.g., 1000 rpm, 1200 rpm or the like). Besides, the motor ECU 40 that has received the torque command $Tm1^*$ of the motor MG1 performs switching control of the switching elements of the inverter 41 such that the motor MG1 is driven according to the torque command $Tm1^*$. Instead of being operated in a self-sustained manner, the engine 22 may be stopped from being operated.

When the accelerator-off control routine is executed, the HVECU 70 first causes data on the brake pedal position BP, the vehicle speed V, the rotational speeds Nm2 and Nm3, and the like to be received thereto (step S100). It should be noted herein that a value detected by the brake pedal position sensor 86 is received as the brake pedal position BP. Besides, a value detected by the vehicle speed sensor 88 is received as the vehicle speed V. Furthermore, values calculated based on the rotational positions θm2, θm3 of the rotors of the motors MG2, MG3 detected by the rotational position detecting sensors 45, 46 are received as the rotational speeds Nm2, Nm3 of the motors MG2, MG3 respectively, through communication from the motor ECU 40.

Figure 3:
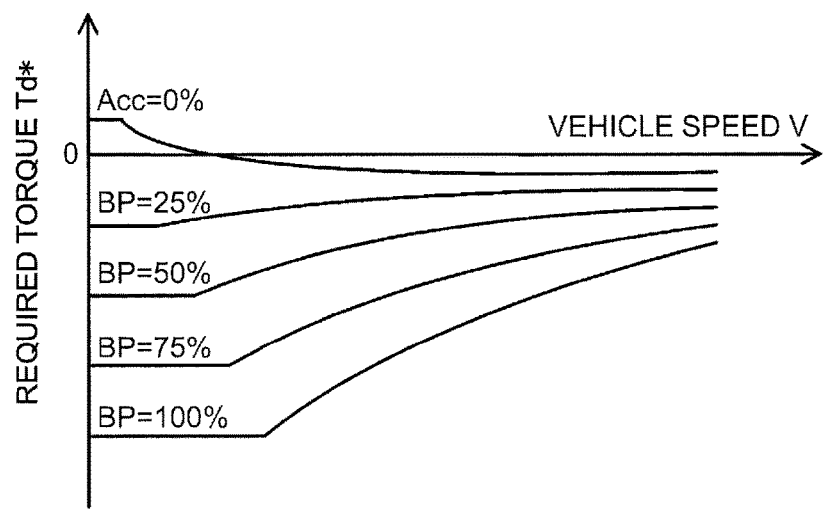
FIG. 3 is an illustrative view showing an exemplary required torque setting map.

When the data are thus received, a required torque $Td^*$ that is required of the vehicle is set based on the receive brake pedal position BP and the vehicle speed V (step S110). As for the required torque $Td^*$, in the embodiment of the invention, a relationship among the brake pedal position BP, the vehicle speed V and the required torque $Td^*$ is determined in advance and stored into the ROM (not shown) as a required torque setting map. When the brake pedal position BP and the vehicle speed V are given, the corresponding required torque $Td^*$ is derived from the stored map and set. FIG. 3 shows an example of the required torque setting map. Incidentally, a case where the required torque $Td^*$ is negative means that a braking torque is required. In this case, negative torques, namely, braking (regenerative) torques are output from the motor MG2 and the motor MG3.

Figure 4:
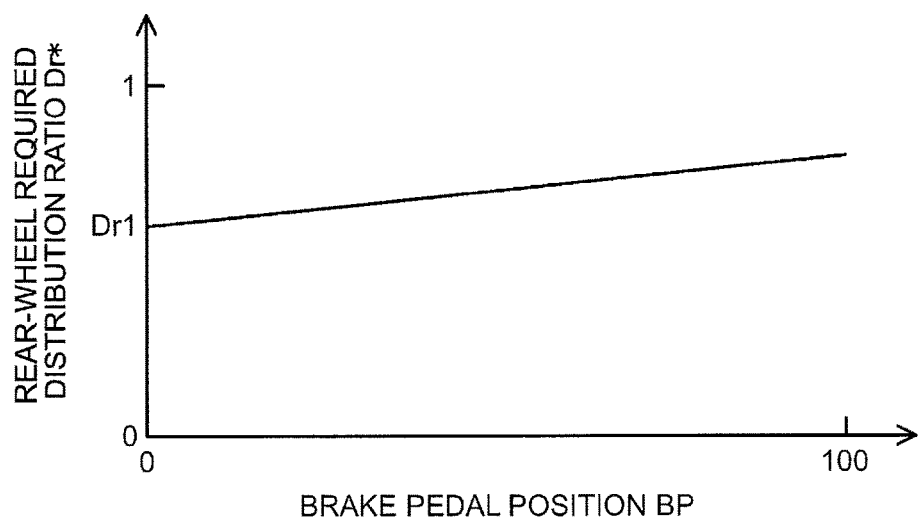
FIG. 4 is an illustrative view showing an exemplary rear-wheel required distribution ratio setting map.

Subsequently, a rear-wheel required distribution ratio $Dr^*$ is set based on the brake pedal position BP (step S120), and a front-wheel required distribution ratio $Df^*$ is calculated by subtracting the set rear-wheel required distribution ratio $Dr^*$ from a value of 1 (step S130). It should be noted herein that the rear-wheel required distribution ratio $Dr^*$ and the front-wheel required distribution ratio $Df^*$ are required values of ratios of torques of the rear wheels 38c, 38d and the front wheels 38a, 38b to the sum of torques of the front wheels 38a, 38b and torques of the rear wheels 38c, 38d respectively. Besides, as for the rear-wheel required distribution ratio $Dr^*$, in the embodiment of the invention, a relationship between the brake pedal position BP and the rear-wheel required distribution ratio $Dr^*$ is determined in advance and stored into the ROM (not shown) as a rear-wheel required distribution ratio setting map. When the brake pedal position BP is given, the corresponding rear-wheel required distribution ratio $Dr^*$ is derived from the stored map and set. FIG. 4 shows an example of the rear-wheel required distribution ratio setting map. As shown in the drawing, the rear-wheel required distribution ratio $Dr^*$ is set to a predetermined value Dr1 when the brake pedal position BP is equal to the value of 0, and the rear-wheel required distribution ratio $Dr^*$ is so set as to tend to increase from the predetermined value Dr1 as the brake pedal position BP increases when the brake pedal position BP is larger than the value of 0. It should be noted herein that a value corresponding to the position of the center of gravity at the time of stoppage of the vehicle (the position of the center of gravity of a static load) is used as the predetermined value Dr1. For example, a value of 0.55, 0.6, 0.65 or the like can be used as this predetermined value Dr1 in the case where a front side of the vehicle is slightly heavier than a rear side of the vehicle (in the case where a load applied to the front wheels 38a, 38b is slightly larger than a load applied to the rear wheels 38c, 38d).

When the rear-wheel required distribution ratio $Dr^*$ and the front-wheel required distribution ratio $Df^*$ are thus set, a front-wheel required torque $Tf^*$ and a required torque $Tr^*$, which are required of the front wheels 38a, 38b and the rear wheels 38c, 38d respectively, are calculated by multiplying the required torque Td* by the front-wheel required distribution ratio Df* and the rear-wheel required distribution ratio Dr* respectively, as indicated by expressions (1), (2) shown below (step S140). Then, basic torques Tm2*tmp*, Tm3*tmp* as basic values of the torque commands Tm2*, Tm3* of the motors MG2 and MG3 are calculated by dividing the front-wheel required torque Tf* and the rear-wheel required torque Tr* by gear ratios Gf and Gr of the reduction gears 35F. 35R respectively, as indicated by expressions (3), (4) shown below (step S150).

$$Tf^* = Td^* \cdot Df^* \tag{1}$$

$$Tr^* = Td^* \cdot Dr^* \tag{2}$$

$$Tm2tmp = Tf^*/Gf \tag{3}$$

$$Tm3tmp = Tr^*/Gr \tag{4}$$

Subsequently, it is determined whether or not the rotational speed Nm2 of the motor MG2 is within a resonance range (step S160), and it is determined whether or not the rotational speed Nm3 of the motor MG3 is within the resonance range (step S170). It should be noted herein that the resonance range of the motor MG2 and the motor MG3 is a range where an n-th order frequency component (n: 1, 2, . . . ) of a noise resulting from regenerative driving of the motor MG2 and the motor MG3 resonates with the rotational speed Nm2 of the motor MG2 and the rotational speed Nm3 of the motor MG3. The aliasing in executing various processes by the HVECU 70 and the motor ECU 40, a noise resulting from the switching of the switching elements of the inverters 42 and 43, or the like is considered to be the noise resulting from regenerative driving of the motor MG2 and the motor MG3. Besides, the noise resulting from regenerative driving of the motor MG2 and the motor MG3 is louder when the rotational speed Nm2 of the motor MG2 and the rotational speed Nm3 of the motor MG3 are within the resonance range than when the rotational speed Nm2 and the rotational speed Nm3 are outside the resonance range, and increases as the absolute values of the torques of the motor MG2 and the motor MG3 (the currents flowing through the respective phases of the motor MG2 and the motor MG3) increase. Incidentally, in the embodiment of the invention, the rotational speed Nm2 of the motor MG2 and the rotational speed Nm3 of the motor MG3 are kept from entering the resonance range at the same time, due to a relationship between a gear ratio Gf of the reduction gear 35F and a gear ratio Gr of the reduction gear 35R or the like.

When both the rotational speed Nm2 of the motor MG2 and the rotational speed Nm3 of the motor MG3 are outside the resonance range, the torque commands Tm2*, Tm3* of the motors MG2, MG3 are set to the basic torques Tm2*tmp*, Tm3*tmp* of the motors MG2, MG3 respectively (step S180). Then, the set torque commands Tm2*, Tm3* of the motors MG2, MG3 are transmitted to the motor ECU 40 (step S230), and the present routine is ended. The motor ECU 40 that has received the torque commands Tm2* and Tm3* of the motors MG2, MG3 performs switching control of the switching elements of the inverters 42, 43 such that the motors MG2, MG3 are driven according to the torque commands Tm2*, Tm3* respectively.

In the embodiment of the invention, as described hitherto, the rear-wheel required distribution ratio Dr* is so set as to tend to increase as the brake pedal position BP increases, the torque commands Tm2*, Tm3* of the motors MG2, MG3 are set using this rear-wheel required distribution ratio Dr* and the required torque Td*, and the motors MG2, MG3 are controlled. At the time of braking, as the brake pedal position BP increases, the deceleration of the vehicle increases, and the likelihood of the vehicle assuming a forward-bent posture increases. Accordingly, the vehicle can be restrained from assuming a forward-bent posture by performing control in this manner. As a result, the stability of the running posture of the vehicle can be restrained from decreasing.

When the rotational speed Nm2 of the motor MG2 is within the resonance range in step S160, a correction torque ΔTm2 (>0) for increasing the torque of the motor MG2 (reducing the absolute value thereof) is set (step S190). Subsequently, as indicated by an expression (5) shown below, the torque command Tm2* of the motor MG2 is calculated by adding the correction torque ΔTm2 to the basic torque Tm2*tmp* of the motor MG2. Also, as indicated by an expression (6) shown below, the torque command Tm3* of the motor MG3 is calculated by subtracting a product of the correction torque ΔTm2 and a value (Gf/Gr) obtained by dividing the gear ratio Gf of the reduction gear 35F by the gear ratio Gr of the reduction gear 35R from the basic torque Tm3*tmp* of the motor MG3 (step S200). Then, the set torque commands Tm2*, Tm3* of the motors MG2, MG3 are transmitted to the motor ECU 40 (step S230), and the present routine is ended.

$$Tm2^* = Tm2tmp + \Delta Tm2 \tag{5}$$

$$Tm3^* = Tm3tmp - \Delta Tm2 \cdot Gf/Gr \tag{6}$$

It should be noted herein that the correction torque ΔTm2 is so set as to tend to increase as the order of the frequency component of a noise resulting from regenerative driving of the motor MG2 in each of a plurality of resonance ranges regarding the rotational speed Nm2 of the motor MG2 decreases in the embodiment of the invention. Besides, the product of the value (Gf/Gr) and the correction torque ΔTm2 means a value obtained by converting the correction torque ΔTm2 into a torque of the rotary shaft of the motor MG3 (the drive shaft 36R).

A noise resulting from regenerative driving of the motor MG2 can be restrained from being perceived by the driver by making the torque command Tm2* of the motor MG2 larger (making the absolute value thereof smaller) when the rotational speed Nm2 of the motor MG2 is within the resonance range than when the rotational speed Nm2 of the motor MG2 is outside the resonance range, as described hitherto. Thus, a noise resulting from regenerative driving of the motor MG2 can be restrained from being perceived by the driver. As a result, the riding comfort of the driver can be restrained from deteriorating. Besides, in general, the perceptibility of a noise resulting from regenerative driving of the motor MG2 to the driver increases as the vehicle speed V decreases. However, a noise resulting from regenerative driving of the motor MG2 can be more reliably restrained from being perceived by the driver by so setting the correction torque ΔTm2 as to tend to increase as the order of the frequency component of a noise resulting from regenerative driving of the motor MG2 in each of a plurality of resonance ranges regarding the rotational speed Nm2 of the motor MG2 decreases (as the vehicle speed in each of the ranges decreases). Incidentally, a value determined based on the specification of the motor MG2 or the like through an experiment, an analysis or the like can be used as the correction torque ΔTm2. Besides, the vehicle can be caused to run with the required torque Td* (the driver's request for deceleration can be coped with), and the sum of regenerative energy produced by the motors MG2, MG3 can be restrained from decreasing, by adjusting an increase in (a decrease in the absolute value of) the basic torque Tm2*tmp* of the torque command Tm2* of the motor MG2 by a decrease in (an increase in the absolute value of) the basic torque Tm3*tmp* of the torque command Tm3* of the motor MG3.

When the rotational speed Nm3 of the motor MG3 is within the resonance range in step S170, a correction torque ΔTm3 (>0) for increasing (reducing the absolute value of) the torque of the motor MG3 is set (step S210). Subsequently, the torque command Tm3* of the motor MG3 is calculated by adding the correction torque ΔTm3 to the basic torque Tm3*tmp* of the motor MG3 as indicated by an expression (7) shown below. Also, the torque command Tm2* of the motor MG2 is set by subtracting a product of the correction torque ΔTm3 and a value (Gr/Gf) obtained by dividing the gear ratio Gr of the reduction gear 35R by the gear ratio Gf of the reduction gear 35F from the basic torque Tm2*tmp* of the motor MG2 as indicated by an expression (8) (step S220). Then, the set torque commands Tm2* and Tm3* of the motors MG2 and MG3 are transmitted to the motor ECU 40 (step S230), and the present routine is ended.

$$Tm3^* = Tm3tmp + \Delta Tm3 \quad (7)$$

$$Tm2^* = Tm2tmp - \Delta Tm3 \cdot Gr/Gf \quad (8)$$

It should be noted herein that the correction torque ΔTm3 is so set as to tend to increase as the order of the frequency component of a noise resulting from regenerative driving of the motor MG3 in each of a plurality of resonance ranges regarding the rotational speed Nm3 of the motor MG3 decreases in the embodiment of the invention. Besides, the product of the value (Gr/Gf) and the correction torque ΔTm3 means a value obtained by converting the correction torque ΔTm3 into a torque of the rotary shaft of the motor MG2 (the drive shaft 36F).

A noise resulting from regenerative driving of the motor MG3 can be restrained from being perceived by the driver by making the torque command Tm3* of the motor MG3 larger (making the absolute value thereof smaller) when the rotational speed Nm3 of the motor MG3 is within the resonance range than when the rotational speed Nm3 of the motor MG3 is outside the resonance range as described above. As a result, the riding comfort of the driver can be restrained from deteriorating. Besides, in general, the perceptibility of a noise resulting from regenerative driving of the motor MG3 to the driver increases as the vehicle speed V decreases. However, a noise resulting from regenerative driving of the motor MG3 can be more reliably restrained from being perceived by the driver by so setting the correction torque ΔTm3 as to tend to increase as the order of the frequency component of a noise resulting from regenerative driving of the motor MG3 in each of a plurality of resonance ranges regarding the rotational speed Nm3 of the motor MG3 decreases (as the vehicle speed in each of the ranges decreases). Incidentally, a value determined based on the specification of the motor MG3 or the like through an experiment, an analysis or the like can be used as the correction torque ΔTm3. Besides, the vehicle can be caused to run with the required torque Td* (the driver's request for deceleration can be coped with), and the sum of regenerative energy produced by the motors MG2, MG3 can be restrained from decreasing, by adjusting an increase in (a decrease in the absolute value of) the basic torque Tm3*tmp* of the torque command Tm3* of the motor MG3 by a decrease in (an increase in the absolute value of) the basic torque Tm2*tmp* of the torque command Tm2* of the motor MG2.

Figure 5:
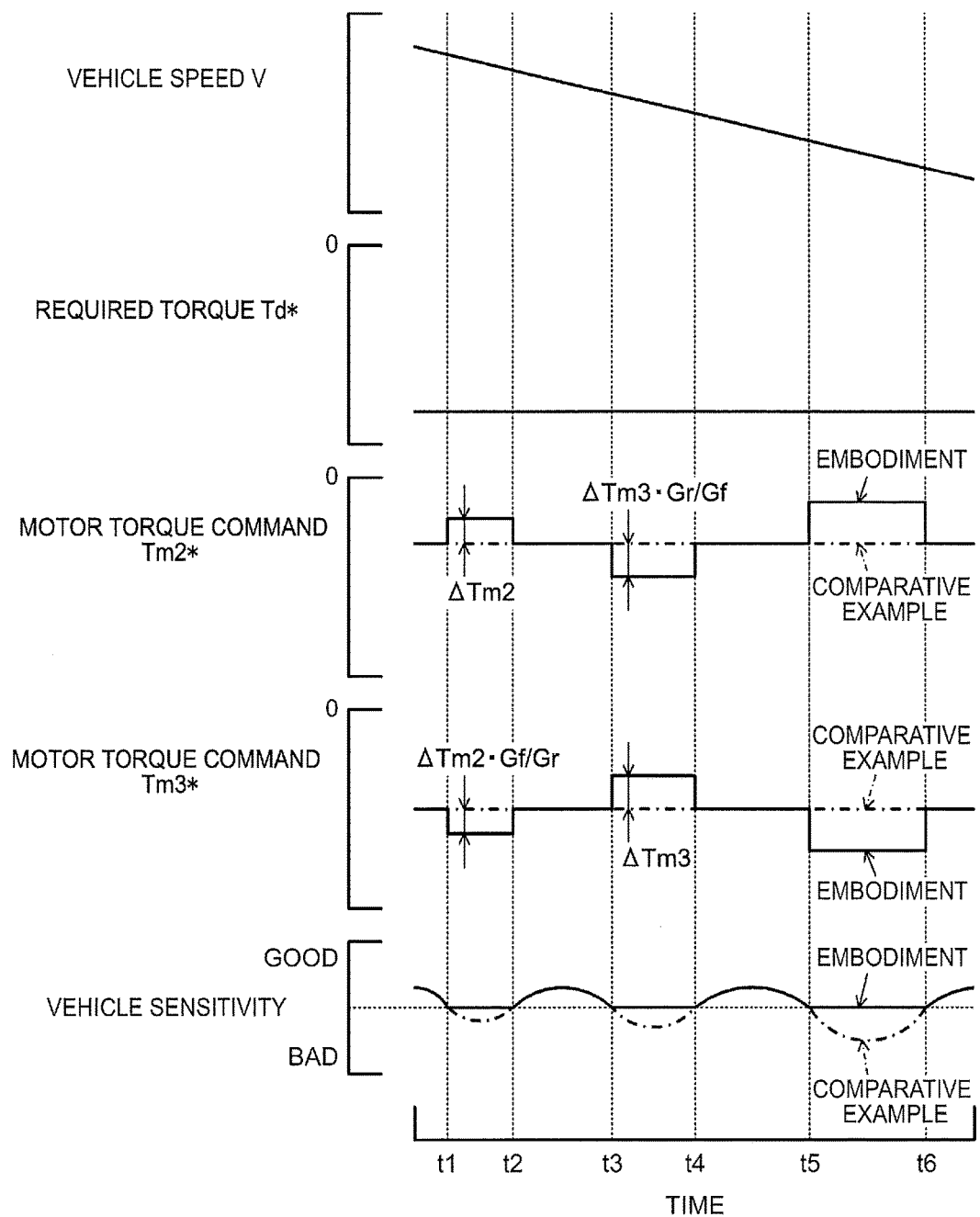
FIG. 5 is an illustrative view showing exemplary changes with time in a vehicle speed V, a required torque Td*, torque commands Tm2* and Tm3* of motors MG2 and MG3, and vehicle sensitivity at the time of deceleration.

FIG. 5 is an illustrative view showing exemplary changes with time in the vehicle speed V, the required torque Td*, the torque commands Tm2*, Tm3* of the motors MG2, MG3, and vehicle sensitivity at the time of deceleration. In the drawing, solid lines indicate changes in the embodiment of the invention, and alternate long and short dash lines indicate changes in a comparative example. It should be noted herein that a case where the torque commands Tm2*, Tm3* of the motors MG2, MG3 are set to the basic torques Tm2*tmp*, Tm3*tmp* of the motors MG2, MG3 regardless of whether or not the rotational speeds Nm2, Nm3 of the motors MG2, MG3 are within the resonance range respectively is considered as the comparative example. Besides, for the sake of easy explanation, FIG. 5 shows changes in the embodiment of the invention and the comparative example in the case where the required torque Td* is negative and constant. Furthermore, in the drawing, a time period between t1 and t2 and a time period between t5 and t6 indicate that the rotational speed Nm2 of the motor MG2 is within the resonance range. A time period between t3 and t4 indicates that the rotational speed Nm3 of the motor MG3 is within the resonance range. The other time periods indicate that both the rotational speed Nm2 of the motor MG2 and the rotational speed Nm3 of the motor MG3 are outside the resonance range.

In the case of the comparative example, as indicated by the alternate long and short dash lines in the drawing, the torque commands Tm2*, Tm3* of the motors MG2, MG3 are set to the basic torques Tm2*tmp*, Tm3*tmp* respectively regardless of whether or not the rotational speeds Nm2, Nm3 of the motors MG2, MG3 are within the resonance range. Therefore, the vehicle sensitivity deteriorates in the time periods between t1 and t2 and between t5 and t6 when the rotational speed Nm2 of the motor MG2 is within the resonance range, and in the time period between t3 and t4 when the rotational speed Nm3 of the motor MG3 is within the resonance range.

By contrast, in the case of the embodiment of the invention, as indicated by the solid lines in the drawing, the torque command Tm2* of the motor MG2 is increased (the absolute value thereof is reduced) by the correction torque ΔTm2, and the torque command Tm3* of the motor MG3 is reduced (the absolute value thereof is increased) by a torque corresponding thereto (ΔTm2·Gf/Gr) in the time periods between t1 and t2 and between t5 and t6. Besides, the torque command Tm3* of the motor MG3 is increased (the absolute value thereof is reduced) by the correction torque ΔTm3, and the torque command Tm2* of the motor MG2 is reduced (the absolute value thereof is increased) by a torque corresponding thereto (ΔTm3·Gr/Gf) in the time period between t3 and t4. Thus, the vehicle can be caused to run with the required torque Td* (the driver's request for deceleration can be coped with) while restraining the vehicle sensitivity (the riding comfort of the driver) from deteriorating. Moreover, the correction torque ΔTm2 is increased from the time period between t1 and t2 to the time period between t5 and t6. Therefore, the vehicle sensitivity can be more reliably restrained from deteriorating when the vehicle speed V is low (when the driver is likely to perceive a noise resulting from regenerative driving of the motor MG2).

With the hybrid vehicle 20 of the embodiment of the invention described above, the motors MG2 and MG3 are controlled such that the braking torque from the motor MG2 and the braking torque from the motor MG3 are smaller and larger respectively when the rotational speed Nm2 of the motor MG2 is within the resonance range than when the rotational speed Nm2 of the motor MG2 and the rotational speed Nm3 of the motor MG3 are outside the resonance range during deceleration caused by the braking torque (the regenerative torque) from the motor MG2 and the braking torque (the regenerative torque) from the motor MG3, and that the vehicle runs with the required torque Td*. Besides, the motors MG2 and MG3 are controlled such that the braking torque from the motor MG3 and the braking torque from the motor MG2 are smaller and larger respectively when the rotational speed Nm3 of the motor MG3 is within the resonance range than when the rotational speed Nm2 of the motor MG2 and the rotational speed Nm3 of the motor MG3 are outside the resonance range during this deceleration, and that the vehicle runs with the required torque Td*. Thus, a noise resulting from regenerative driving of the motor MG2 and the motor MG3 can be restrained from being perceived by the driver. As a result, the riding comfort of the driver can be restrained from deteriorating. Then, the braking torque of the motor MG2 is reduced as the order of the frequency component of a noise resulting from regenerative driving of the motor MG2 in each of a plurality of resonance ranges regarding the rotational speed Nm2 of the motor MG2 decreases (as the vehicle speed in each of the ranges decreases) when the rotational speed Nm2 of the motor MG2 is within the resonance range, and the braking torque of the motor MG3 is reduced as the order of the frequency component of a noise resulting from regenerative driving of the motor MG3 in each of a plurality of resonance ranges regarding the rotational speed Nm3 of the motor MG3 decreases (as the vehicle speed in each of the ranges decreases) when the rotational speed Nm3 of the motor MG3 is within the resonance range. Thus, a noise resulting from regenerative driving of the motor MG2 and the motor MG3 can be more reliably restrained from being perceived by the driver.

With the hybrid vehicle 20 of the embodiment of the invention, the correction torque ΔTm2 is so set as to tend to increase as the order of the frequency component of a noise resulting from regenerative driving of the motor MG2 in each of a plurality of resonance ranges regarding the rotational speed Nm2 of the motor MG2 decreases when the rotational speed Nm2 of the motor MG2 is within the resonance range during deceleration. However, the correction torque ΔTm2 may be so set as to tend to increase as the rotational speed Nm2 of the motor MG2 (the vehicle speed V) decreases. Besides, the correction torque ΔTm2 may be set to a constant value in any one of the resonance ranges. By the same token, in the embodiment of the invention, the correction torque ΔTm3 is so set as to tend to increase as the order of the frequency component of a noise resulting from regenerative driving of the motor MG3 in each of a plurality of resonance ranges regarding the rotational speed Nm3 of the motor MG3 decreases when the rotational speed Nm3 of the motor MG3 is within the resonance range during deceleration. However, the correction torque ΔTm3 may be so set as to tend to increase as the rotational speed Nm3 of the motor MG3 (the vehicle speed V) decreases. Besides, the correction torque ΔTm3 may be set to a constant value in any one of the resonance ranges.

Figure 6:
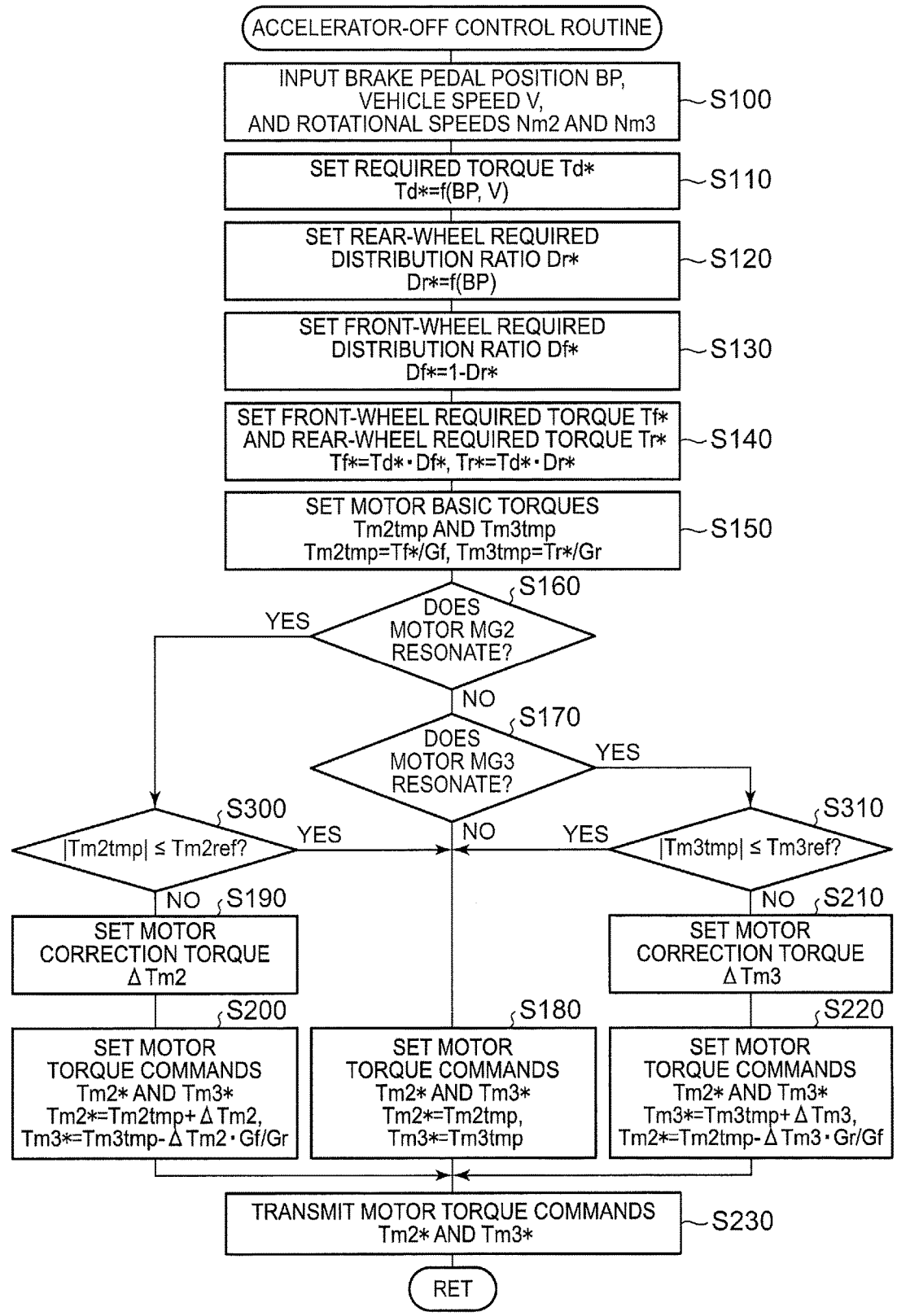
FIG. 6 is a flowchart showing an exemplary accelerator-off control routine of a modification example.

With the hybrid vehicle 20 of the embodiment of the invention, the HVECU 70 executes the aforementioned accelerator-off control routine of FIG. 2 when the accelerator is off. Instead, however, the HVECU 70 may execute an accelerator-off control routine of FIG. 6. It should be noted herein that the routine of FIG. 6 is identical to the routine of FIG. 2 except in that processes of steps S300 and S310 are added to the routine of FIG. 2. Accordingly, in the routine of FIG. 6, the same processes as in the routine of FIG. 2 are denoted by the same step numbers respectively, and detailed description thereof will be omitted.

In the routine of FIG. 6, when the rotational speed Nm2 of the motor MG2 is within the resonance range in step S160, the absolute value of the basic torque Tm2tmp of the motor MG2 is compared with a threshold Tm2ref (step S300). It should be noted herein that the threshold Tm2ref is an upper limit of the absolute value of the torque of the motor MG2 that is assumed to prevent a noise resulting from regenerative driving of the motor MG2 from being perceived by the driver, and that a value determined through an experiment, an analysis or the like can be used as the threshold Tm2ref.

When the absolute value of the basic torque Tm2tmp of the motor MG2 is larger than the threshold Tm2ref in step S300, the correction torque ΔTm2 is set in the same manner as in the routine of FIG. 2 (step S190). Then, the torque commands Tm2*, Tm3* of the motors MG2, MG3 are set using the set correction torque ΔTm2 and the basic torques Tm2tmp, Tm3tmp of the motors MG2, MG3 (step S200), the set torque commands Tm1*, Tm2* of the motors MG2, MG3 are transmitted to the motor ECU 40 (step S230), and the present routine is ended. In this case, as is the case with the embodiment of the invention, a noise resulting from regenerative driving of the motor MG2 can be restrained from being perceived by the driver, and the riding comfort of the driver can be restrained from deteriorating.

When the absolute value of the basic torque Tm2tmp of the motor MG2 is equal to or smaller than the threshold Tm2ref in step S300, the torque commands Tm2*, Tm3* of the motors MG2, MG3 are set to the basic torques Tm2tmp, Tm3tmp of the motors MG2, MG3 respectively (step S180), the set torque commands Tm2*, Tm3* of the motors MG2, MG3 are transmitted to the motor ECU 40 (step S230), and the present routine is ended. In this case, the stability of the running posture of the vehicle can be restrained from decreasing as is the case with the time when both the rotational speed Nm2 of the motor MG2 and the rotational speed Nm3 of the motor MG3 are outside the resonance range.

When the rotational speed Nm3 of the motor MG3 is within the resonance range in step S170, the absolute value of the basic torque Tm3tmp of the motor MG3 is compared with a threshold Tm3ref (step S310). It should be noted herein that the threshold Tm3ref is an upper limit of the absolute value of the torque of the motor MG3 that is assumed to prevent a noise resulting from regenerative driving of the motor MG3 from being perceived by the driver, and that a value determined through an experiment, an analysis or the like can be used as the threshold Tm3ref.

When the absolute value of the basic torque Tm3tmp of the motor MG3 is larger than the threshold Tm3ref in step S310, the correction torque ΔTm3 is set in the same manner as in the routine of FIG. 2 (step S210). Then, the torque commands Tm2* and Tm3* of the motors MG2, MG3 are set using the set correction torque ΔTm3 and the basic torques Tm2tmp, Tm3tmp of the motors MG2, MG3 (step S220), the set torque commands Tm2*, Tm3* of the motors MG2, MG3 are transmitted to the motor ECU 40 (step S230), and the present routine is ended. In this case, as is the case with the embodiment of the invention, a noise resulting from regenerative driving of the motor MG3 can be restrained from being perceived by the driver, and the riding comfort of the driver can be restrained from deteriorating.

When the absolute value of the basic torque Tm3tmp of the motor MG3 is equal to or smaller than the threshold Tm3ref in step S310, the torque commands Tm2*, Tm3* of the motors MG2, MG3 are set to the basic torques Tm2tmp, Tm3tmp of the motors MG2, MG3 respectively (step S180), the set torque commands Tm2*, Tm3* of the motors MG2, MG3 are transmitted to the motor ECU 40 (step S230), and the present routine is ended. In this case, the stability of the running posture of the vehicle can be restrained from decreasing as is the case with the time when both the rotational speed Nm2 of the motor MG2 and the rotational speed Nm3 of the motor MG3 are outside the resonance range.

With the hybrid vehicle 20 of the embodiment of the invention, when the accelerator is off, the rear-wheel required distribution ratio Dr* is set based on the brake pedal position BP. However, the rear-wheel required distribution ratio Dr* may be set based on the deceleration of the vehicle instead of or in addition to the brake pedal position BR Besides, the rear-wheel required distribution ratio Dr* may be set based also on the steering angle θst or the like from the steering angle sensor 99st or the like in addition to the brake pedal position BP and the deceleration of the vehicle. Furthermore, the rear-wheel required distribution ratio Dr* may be set to a constant value regardless of the brake pedal position BP or the like.

With the hybrid vehicle 20 of the embodiment of the invention, the drive shaft 36F is coupled to the front wheels 38a, 38b via the reduction gear 35F, and the drive shaft 36R is coupled to the rear wheels 38c, 38d via the reduction gear 35R. However, the drive shaft 36F may be coupled to the front wheels 38a, 38b without the intermediary of the reduction gear 35F. Besides, the drive shaft 36F may be coupled to the front wheels 38a, 38b via a transmission instead of the reduction gear 35F. Furthermore, the drive shaft 36R may be coupled to the rear wheels 38c, 38d without the intermediary of the reduction gear 35R. In addition, the drive shaft 36R may be coupled to the rear wheels 38c, 38d via the transmission instead of the reduction gear 35R.

Figure 7:
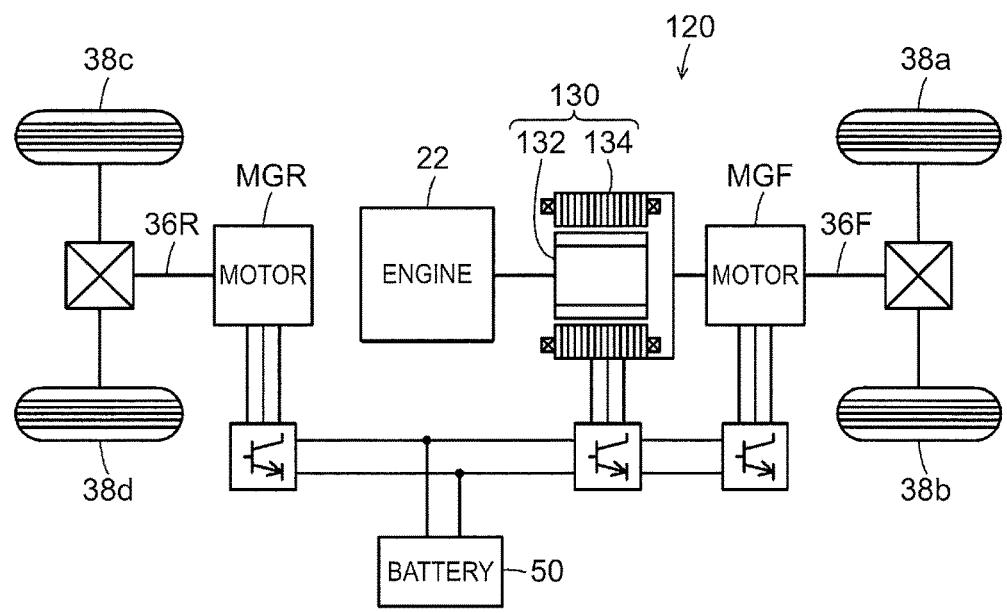
FIG. 7 is a block diagram showing the schematic configuration of a hybrid vehicle 120 of the modification example.
Figure 8:
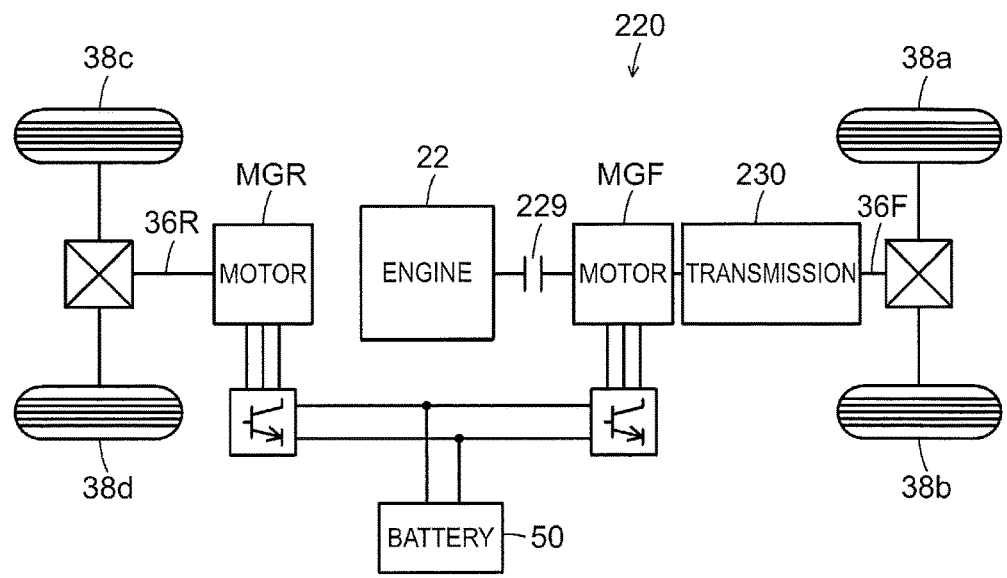
FIG. 8 is a block diagram showing the schematic configuration of a hybrid vehicle 220 of another modification example.
Figure 9:
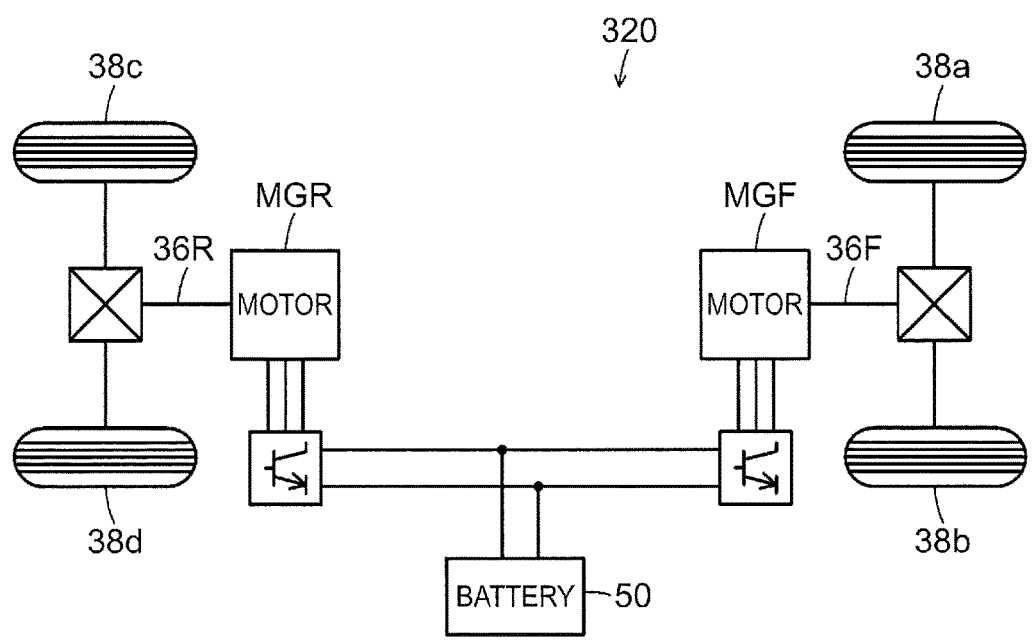
FIG. 9 is a block diagram showing the schematic configuration of an electric vehicle 320 of still another modification example.

In the embodiment of the invention, the hybrid vehicle 20 is configured to be equipped with the engine 22 and the motor MG1 that are connected to the drive shaft 36F, which is coupled to the front wheels 38a, 38b via the reduction gear 35F, via the planetary gear 30, the motor MG2 that is connected to the drive shaft 36F, and the motor MG3 that is connected to the drive shaft 36R, which is coupled to the rear wheels 38c, 38d via the reduction gear 35R. However, as shown in FIG. 7, a hybrid vehicle 120 may be configured to be equipped with the engine 22, a paired rotor electric motor 130, a motor MGF that is connected to the drive shaft 36F, and a motor MGR that is connected to the drive shaft 36R. The paired rotor electric motor 130 has an inner rotor 132 that is connected to the engine 22, and an outer rotor 134 that is connected to the drive shaft 36F. The paired rotor electric motor 130 transmits part of a motive power from the engine 22 to the drive shaft 36F, and converts the remaining motive power into an electric power. Besides, as shown in FIG. 8, a hybrid vehicle 220 may be configured to be equipped with the engine 22, the motor MGF that is connected to the engine 22 via a clutch 229, a transmission 230 that is connected to the motor MGF and the drive shaft 36F, and the motor MGR that is connected to the drive shaft 36R. Furthermore, as shown in FIG. 9, an electric vehicle 320 may be configured to be equipped with the motor MGF that is connected to the drive shaft 36F, and the motor MGR that is connected to the drive shaft 36R.

In the embodiment of the invention, the motor MG2 is one of the examples of "the front-wheel motor", the motor MG3 is one of the examples of "the rear-wheel motor", and the battery 50 is one of the examples of "the battery".

Although the embodiment of the invention has been described above, the invention should not be limited at all to this embodiment thereof. As a matter of course, the invention can be carried out in various modes without departing from the gist thereof.

The aforementioned hybrid vehicle is utilizable in the industries for manufacturing hybrid vehicles and the like.

The invention claimed is:

1. A vehicle comprising:
   an accelerator pedal;
   a brake pedal;
   a front wheel;
   a rear wheel;
   a front-wheel motor configured to receive and output motive power to and from the front wheel;
   a rear-wheel motor configured to receive and output motive power to and from the rear wheel;
   a battery configured to exchange electric power with the front-wheel motor and the rear-wheel motor; and
   an electronic control unit configured to
   (i) control the front-wheel motor and the rear-wheel motor such that the vehicle runs with a required torque based on an operation of the accelerator pedal and an operation of the brake pedal,
   (ii) set a front basic torque of the front-wheel motor and set a rear basic torque of the rear-wheel motor based on the required torque,
   (iii) control the front-wheel motor and rear-wheel motor, during deceleration caused by a braking torque from the front-wheel motor and a braking torque from the rear-wheel motor, such that:
   (a) when the front-wheel motor has a rotation speed outside of a front resonance range, and the rear-wheel motor has a rotation speed outside of a rear resonance range, braking torque for the front-wheel motor and rear-wheel motor are respectively set at the front basic torque and the rear basic torque,
   (b) when the front-wheel motor is operating with a rotation speed within the front resonance range, the electronic control unit is configured to drive the front-wheel motor with a torque whose absolute value is smaller than the front basic torque, and to drive the rear-wheel motor with a torque whose absolute value is larger than the rear basic torque,
   (c) when the front-wheel motor is operating with a rotation speed within the front resonance range and an absolute value of the front basic torque is equal to or smaller than a first threshold during deceleration, the electronic control unit is configured to drive the front-wheel motor with the front basic torque and drive the rear-wheel motor with the rear basic torque,
   (d) when the rear-wheel motor is operating with a rotation speed within the rear resonance range, the electronic control unit is configured to drive the rear-wheel motor with a torque whose absolute value is smaller than the rear basic torque, and to drive the front-wheel motor with a torque whose absolute value is larger than the front basic torque, and
   (e) when the rear-wheel motor is operating with a rotation speed within the rear resonance range and an absolute value of the rear basic torque is equal to or smaller than a second threshold during deceleration, the electronic control unit is configured to drive the front-wheel motor with the front basic torque and drive the rear-wheel motor with the rear basic torque, wherein the front resonance range being a rotation speed range at which the front-wheel motor resonates and the rear resonance range being a rotation speed range at which the rear-wheel motor resonates.

2. The vehicle according to claim 1, wherein
as vehicle speed decreases, an amount of reduction of the front-wheel motor torque and an amount of increase of the rear-wheel motor torque when the front-wheel motor is operating with a rotation speed within the front resonance range are respectively more than an amount of reduction of the front-wheel motor torque and an amount of increase of the rear-wheel motor torque when the front-wheel motor is operating with a rotation speed outside of the front resonance range;
or
as vehicle speed decreases, an amount of increase of the front-wheel motor torque and an amount of reduction of the rear-wheel motor torque when the rear-wheel motor is operating with a rotation speed within the rear resonance range are respectively more than an amount of increase of the front-wheel motor torque and an amount of reduction of the rear-wheel motor torque when the rear-wheel motor is operating with a rotation speed outside of the rear resonance range.

3. The vehicle according to claim 1, wherein
the electronic control unit is configured to increase a ratio of a torque of the rear-wheel motor to a sum of a torque of the front-wheel motor and the torque of the rear-wheel motor as a brake operation amount increases, during the deceleration.

4. The vehicle according to claim 1, further comprising:
an engine;
a generator; and
a planetary gear that includes three rotary elements, wherein
the three rotary elements are connected to a front-wheel drive shaft that is coupled to the front wheel, an output shaft of the engine, and a rotary shaft of the generator respectively.

* * * * *